Figure 1:
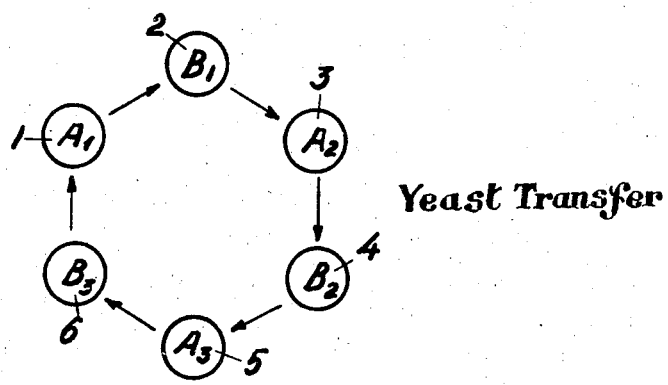

July 5, 1938.　　　B. V. HANSEN　　　2,122,939

FERMENTATION OF WORT BY YEAST

Filed Feb. 24, 1937

Yeast Transfer

Yeast Exchange 1-10 Fermentation Vats
$A_1$-$A_3$ Fermentation Type "A"
$B$-$B_3$ Fermentation Type "B"

B. V. Hansen
Inventor

By: Glascock Downing & Seebold
Attys.

Patented July 5, 1938

2,122,939

UNITED STATES PATENT OFFICE 2,122,939

FERMENTATION OF WORT BY YEAST

Børge Valdemar Hansen, Randers, Denmark, assignor to Aktieselskabet Dansk Gaerings-Industri, Copenhagen, Denmark Application February 24, 1937, Serial No. 127,542
In Denmark February 26, 1936

7 Claims. (Cl. 195—37)

In the manufacture of yeast and spirit a considerable number of methods have been proposed in the course of time permitting to recover at one and the same time yeast, especially compressed yeast, and spirit in various proportions and, moreover, methods have been produced permitting the production of yeast completely without simultaneous production of alcohol.

According to some of these methods the yeast remains during the total fermentation process in one and the same wort whereas according to other methods for instance "continuous" methods so-called, yeast is withdrawn from the wort, a quantity of yeast being in some cases supplied to the wort from other systems during the fermentation. In connection with certain known methods in which yeast-containing wort is withdrawn from the fermentation vat whereas the yeast content of the wort withdrawn is re-added to the vat it has been proposed passing the yeast, before it is added again, through another vat containing fermenting wort. Even in case of thus passing the yeast through another fermentation vat the whole procedure results in re-adding yeast to the fermentation vat from which it has been derived originally. Of all these methods it is true that the quality of the yeast produced and the yield of yeast obtained will in the most favourable cases be equal to that of a fermentation process in which fresh wort is added to the fermenting wort during fermentation, which type of fermentation process will in the following be termed "addition" process of fermentation.

The method of producing yeast, especially compressed yeast, and spirit forming the subject matter of the present invention differs from known methods in which yeast is withdrawn from or added to the fermenting wort in that at least two fermentations are initiated and carried out and in that at least once during fermentation a quantity of yeast from one fermentation is interchanged for a quantity of yeast from another fermentation without simultaneous exchange of the corresponding amounts of wort. The interchange of yeast is undertaken either immediately or later on during the fermentation and either continuously or discontinuously in which latter case the exchange may be carried out once or several times. This permits of certain important advantages being obtained.

Thus for instance in the case of a fermentation, in which alcohol is produced, being carried out simultaneously with a fermentation in which there is produced no alcohol, it is possible by adding yeast from the former fermentation to the latter to obtain a considerable stimulation of the yeast produced therein at the same time obtaining good yields of yeast and spirit in the fermentation in which spirit is produced. According to the conditions the principal stress may be laid either on the production of yeast, the quality of which has been improved, or on the obtention of a greater combined yield of yeast and spirit in proportion to the quantity of raw material treated than could be obtained by using known methods, or on obtaining both advantages at one and the same time.

As it will be already understood from the suggestions given above the advantages of the mutual exchange of yeast may preferably be utilized when fermentations differing one from the other one or one group from the other groups are carried out in the two or several fermentation vats. Such fermentations may for instance both or all be of the kind in which spirit is produced although it may be to a different extent in the various fermentations, or one or more of the fermentations may be of the kind in which no alcohol is produced; moreover the fermentations may be initiated at the same time or with a certain displacement of phase; again, the fermentations may be of different duration so that they will terminate at different times. In the latter case the yeast from the vat or vats in which the fermentation is at first terminated may be separated and pressed with or without previous washing while continuing the fermentation in one or more other vats. The yeast from the vat or vats in which the fermentation is terminated at a later moment than are the first fermentation or fermentations may then also be separated with or without washing and be pressed in the usual manner, after which the yeast derived from the two fermentations may either be utilized individually or in bulk for commercial yeast or for seed yeast.

It may also be advantageous to transfer the separated yeast, with or without previous washing, from the vat or vats in which fermentation is first terminated, to the vat or vats in which the fermentation has not yet been terminated so as to permit it to develop further there, after which, when the fermentation has been terminated in this or these vats the total quantity of yeast is separated and pressed in the usual manner with or without washing it previous to the separation.

By way of illustration of the invention an embodiment of the same will be described in the following.

*Example*

1200 kgs. of molasses are clarified in the known manner (by chemical treatment or separation of the sludge by centrifugal action etc.) after which the clarified molasses with or without previous dilution with water is divided into two parts of which one, corresponding to 400 kgs. of the molasses, is to be treated by a fermentation in accordance with the addition method without production of alcohol whereas the balance of the solution of molasses, corresponding to 800 kgs, of the same, is to be used in a fermentation in which alcohol is produced and which is also carried out in accordance with the addition method.

The fermentation producing no alcohol is planned to be of a duration of 14 hours and 80 kgs. of seed yeast is used for initiating the same, whereas the fermentation in which alcohol is produced is planned to be of a duration of 7 hours only, 72 kgs. of seed yeast being used for initiating this fermentation. In the former fermentation the temperature is 26° C. increasing to 30° C. during the fermentation, whereas the latter fermentation is carried out at a constant temperature of 30° C. The fermentation which will be called A in which no alcohol is produced is initiated at the moment O in a vat whereas the fermentation called B in which alcohol is produced is started in another vat at the time 2, the displacement of phases being 2 hours; both vats are aerated during the fermentation. From each vat samples are taken every full hour for ascertaining the condition of fermentation, and the quantities of chemical substances to be added to the fermenting wort are determined on the base of the results thus achieved.

At the time 3 an embodiment of the mutual exchange of yeast between the fermentation vats characteristic of the present method is started by withdrawing and separating such a quantity of wort from the vat containing fermentation B that the same will contain half the quantity of yeast present in this vat. The separated yeast is conducted to the vat containing fermentation A whereas the separated wort is returned to the first mentioned vat. Immediately after this an equally great quantity of yeast is withdrawn from fermentation A and separated, the separated yeast being transferred to the fermentation B and the separated wort being returned to the fermentation A. At the times 5 and 7 similar exchanges of the yeast quantities of the two fermentations are carried out, a quantity of yeast corresponding to half the yeast quantity present at the time in question in fermentation B being exchanged each time.

At the time 9 the fermentation B will be finished. The total contents of the fermentation vat are then separated and the separated yeast is transferred with or without previous washing to the fermentation A, whereas the separated wort and the washing water if so desired is subjected to distillation. When separation of the contents of the vat containing fermentation B has been terminated a quantity of wort is withdrawn from fermentation A the yeast contents of which correspond to the quantity of yeast transferred from the fermentation B in the latter separation stage; the separated wort is returned to the fermentation A. The quantity of yeast removed and separated at this moment is pressed either immediately or later on, which, if so desired, is done together with washing and pressing of the yeast from the fermentation A when the fermentation in this vat has been terminated. In the said vat the fermentation is continued still without production of alcohol until the time 14 at which moment the contents of the vat are separated, the separated yeast being subjected to washing and pressing either alone or together with the quantity of yeast withdrawn at the time 9 as already mentioned.

The total yield after detraction of the 152 kgs. of said yeast used amounts to 726 kgs. yeast (containing 25% of dry substances) and 232 liters of alcohol of 100%. The average yield in both fermentations has thus been 60.5% yeast and 19.3% alcohol, from which a yield of about 25% yeast and about 29% alcohol must be ascribed to the fermentation in which alcohol is produced whereas a yield of about 131% of yeast must be ascribed to the fermentation in which no alcohol is produced, all yields being calculated on the amount of molasses used for the fermentation in question. In both fermentations the yeast was of a better quality than the yeast which could have been obtained by carrying out a fermentation without production of alcohol using the addition process. The advantage that can be obtained in the present process is thus in the case described divided in such a manner that both an advantageous yield of yeast and an advantageous quality of yeast has been obtained.

In the system of fermentation processes described in the example two fermentations vats only are employed in which two different fermentations, viz. an A-fermentation and a B-fermentation, are initiated. The difference between these fermentations consists i. e. as already mentioned in different yields, durations, temperatures of fermentation, amounts of seed yeast and displacements of phase. The differences, however, need not comprise all these conditions and no others, but they may also display themselves in other ways, for instance in one of the fermentations A and B being aerated and the other one being not aerated or in the aeration being carried out with different intensity in the two fermentations. The two different fermentations may be carried out in more than two fermentation vats, one and the same fermentation being carried out within a group or groups of these vats. In cases where the exchange is carried out within a number of different fermentations more than two fermentations may be established in a number of vats corresponding to the number of different fermentations, or in more vats.

Figures 2, 3:
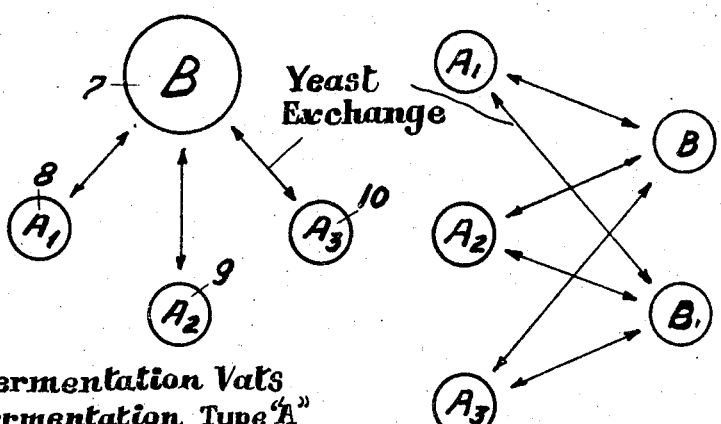

In Figs. 1, 2 and 3 of the drawing are shown diagrammatically examples of systems according to which the exchange of yeast between more than two fermentation vats in which different fermentations processes have been established, may be carried out.

According to Fig. 1 A-fermentations $A_1$, $A_2$ and $A_3$ being for instance essentially similar, are established in fermentation vats 1, 3 and 5, whereas in three other vats 2, 4 and 6 B-fermentations $B_1$, $B_2$ and $B_3$ which may also be essentially similar, are established. When the exchange carried out in the manner indicated by the arrows, the vat 1 yielding for instance yeast for the B-fermentation $B_1$ of the vat 2, the yeast withdrawn from the vat 1 being replaced by the same receiving yeast from the B-fermentation $B_3$ taking place in the fermentation vat 6, the result obtained may be similar to the result that could be obtained when the exchange was carried out between an A-fermentation and a B-fermentation carried out in each of two fermentation vats.

According to Fig. 2 the yeast of the fermentation vat 7 in which a B-fermentation is carried out is exchanged for the yeast of each of the three fermentation vats 8, 9 and 10 in which fermentations $A_1$, $A_2$ and $A_3$, which may be mutually different and all different from B, are carried out.

According to Fig. 3 the exchange is carried out between a number of fermentations $A_1$, $A_2$, $A_3$ and B and $B_1$ in various manners as suggested by the arrows.

The process is described in the example given above in connection with mashes produced from molasses. It may, however, also be used in connection with mashes produced from starch-containing raw materials, sulphite waste liquor, wood or similar substances being directly or indirectly fermentable. Moreover the fermentations or one or more of them may be carried out in accordance with the addition-process or as a circulation fermentation, stepwise fermentation or in accordance with other known methods.

The extent to which yeast quantities are mutually exchanged in a system of fermentations during the fermentative process may be varied which also applies to the moments at which the exchange is carried out. By combining suitable fermentation components in various manners and by varying in the manner known per se the conditions of the individual fermentation processes it is possible to conduct the fermentation within wide limits so as to produce the proportion desired between the yields of yeast and alcohol.

The method may be equally well employed for the production of seed yeast and for the production of commercial yeast.

I claim:

1. In the fermentation of wort by yeast in two vats at different conditions removing partially the yeast from the wort of one vat and adding in its place to the wort from which the yeast has been partially removed yeast removed from the wort of the other vat and treating the wort of the first vat by the mixture of yeast so formed and adding the yeast removed from the first vat to the wort in the other vat from which wort the yeast has been partially removed for addition to the first vat, and treating the wort in the other vat by the mixture of yeast so formed.

2. In the fermentation of wort by yeast in two vats in which the fermentation has been started at different points of time removing partially the yeast from the wort of one vat and adding in its place to the wort from which the yeast has been partially removed yeast removed from the wort of the other vat, and treating the wort of the first vat by the mixture of yeast so formed, and adding the yeast removed from the first vat to the wort in the other vat from which wort the yeast has been partially removed for addition to the first vat, and treating the wort in the other vat by the mixture of yeast so formed.

3. In the fermentation of wort by yeast in two vats at different conditions removing partially the yeast from the wort of one vat and adding such yeast removed from the said vat to the wort of the other vat forming therein a mixture of the yeast already contained therein with the yeast added and removing from this wort part of the yeast leaving the wort to the treatment by the remaining part of the mixture of yeast, and adding such yeast removed from the said other wort to the wort of the first vat from which yeast was initially removed and treating the wort of the said first vat by the mixture of yeast so formed.

4. In the fermentation of wort by yeast in two vats in which the fermentation has been started at different points of time removing partially the yeast from the wort of one vat and adding such yeast removed from the said vat to wort of the other vat forming therein a mixture of the yeast already contained therein with the yeast added, and removing from this wort of the said other vat part of the yeast leaving the wort to the treatment by the remaining part of the mixture of yeast, and adding such yeast, removed from the said other wort, to the wort of the first vat from which yeast was initially removed, and treating the wort of the said first vat by the mixture of yeast so formed.

5. In the fermentation of wort by yeast in several vats transferring yeast from the wort of one vat to the wort of another vat and returning in change yeast from the said other wort to the first wort, said interchanging of yeast between two of the vats in both directions being extended to comprise all the vats.

6. In the fermentation of wort by yeast in an even number of vats exceeding two vats instituting in the vats one of two fermentations alternately and transferring at a point of time during the fermentation part of the yeast from one of the worts to the next one in the series and from that wort to the next one, etc., until the transference comprises all the vats and treating the wort by the mixture of yeast so formed.

7. In the fermentation of wort by yeast in an even number of vats exceeding two vats instituting in the vats a series of fermentations starting the same at two different points of time and transferring at a point of time during the fermentation part of the yeast from one of the fermenting wort to another wort started at a point of time different from the starting time of the fermentation in the wort from which the yeast is withdrawn and withdrawing from this wort part of the yeast and adding it to a wort in which fermentation has been started at the first point of time, etc., the said transport of yeast from one wort to the other one comprising all the vats in which fermentation has been started at alternate points of time.

BØRGE VALDEMAR HANSEN.